(12) United States Patent
Fujimoto

(10) Patent No.: US 11,077,916 B2
(45) Date of Patent: Aug. 3, 2021

(54) BICYCLE CHAIN GUIDE ASSEMBLY

(71) Applicant: SHIMANO INC., Sakai (JP)

(72) Inventor: Naoki Fujimoto, Sakai (JP)

(73) Assignee: SHIMANO INC., Osaka (JP)

( * ) Notice: Subject to any disclaimer, the term of this patent is extended or adjusted under 35 U.S.C. 154(b) by 547 days.

(21) Appl. No.: 15/938,699

(22) Filed: Mar. 28, 2018

(65) Prior Publication Data

US 2019/0127023 A1     May 2, 2019

Related U.S. Application Data

(63) Continuation-in-part of application No. 15/795,761, filed on Oct. 27, 2017, now abandoned.

(51) Int. Cl.
*B62M 9/126* (2010.01)
*B62M 9/12* (2006.01)
*B62M 9/00* (2006.01)

(52) U.S. Cl.
CPC .............. *B62M 9/126* (2013.01); *B62M 9/12* (2013.01); *B62M 2009/007* (2013.01)

(58) Field of Classification Search
CPC ........ B62M 9/12; B62M 9/126; B62M 9/131; B62M 2009/007
See application file for complete search history.

(56) References Cited

U.S. PATENT DOCUMENTS

| | | | |
|---|---|---|---|
| 8,968,129 B2 | 3/2015 | Emura et al. | |
| 10,252,773 B2 | 4/2019 | Inoue et al. | |
| 2006/0019782 A1* | 1/2006 | Wickliffe | B62M 9/136 474/80 |
| 2007/0197324 A1* | 8/2007 | Fujii | B62M 9/136 474/80 |
| 2008/0167148 A1* | 7/2008 | Siah | B62M 9/1344 474/80 |
| 2009/0042679 A1* | 2/2009 | Valle | B62M 9/12 474/152 |
| 2009/0295120 A1* | 12/2009 | Sloan | B62K 19/44 280/274 |
| 2010/0093472 A1* | 4/2010 | Oseto | B62M 9/126 474/80 |

(Continued)

FOREIGN PATENT DOCUMENTS

| | | |
|---|---|---|
| CN | 203698584 U | 7/2014 |
| CN | 204161602 U | 2/2015 |
| EP | 2 832 632 A1 | 2/2015 |

*Primary Examiner* — Michael R Mansen
*Assistant Examiner* — Robert T Reese
(74) *Attorney, Agent, or Firm* — Oliff PLC

(57) ABSTRACT

A bicycle chain guide includes a base and a chain guide. The base is configured to be mounted to a bicycle that includes a solitary sprocket having a rotational center axis. The chain guide is disposed above the solitary bicycle sprocket in a mounted state where the base is mounted to the bicycle. The chain guide includes a first guide plate, a second guide plate, and a bridge. The first guide plate has a first guiding surface. The second guide plate is closer to the base than the first guide plate and has a second guiding surface facing the first guiding surface to define a chain guiding slot between the first guiding surface and the second guiding surface. The bridge connects the first guide plate and the second guide plate.

20 Claims, 10 Drawing Sheets

(56) References Cited

U.S. PATENT DOCUMENTS

| | | | |
|---|---|---|---|
| 2013/0095969 A1* | 4/2013 | Santurbane | F16B 37/125 |
| | | | 474/140 |
| 2014/0051535 A1 | 2/2014 | Cranston et al. | |
| 2015/0094177 A1* | 4/2015 | Emura | B62M 9/1342 |
| | | | 474/80 |
| 2015/0115568 A1* | 4/2015 | Emura | B62M 9/135 |
| | | | 280/261 |
| 2016/0068225 A1* | 3/2016 | Kuwayama | B62M 9/1342 |
| | | | 474/80 |
| 2017/0001684 A1* | 1/2017 | McGriskin | B62M 9/128 |
| 2017/0004512 A1 | 1/2017 | Weider | |
| 2017/0283005 A1* | 10/2017 | Inoue | F16H 55/30 |
| 2018/0112764 A1* | 4/2018 | Sugimoto | B62M 1/36 |

\* cited by examiner

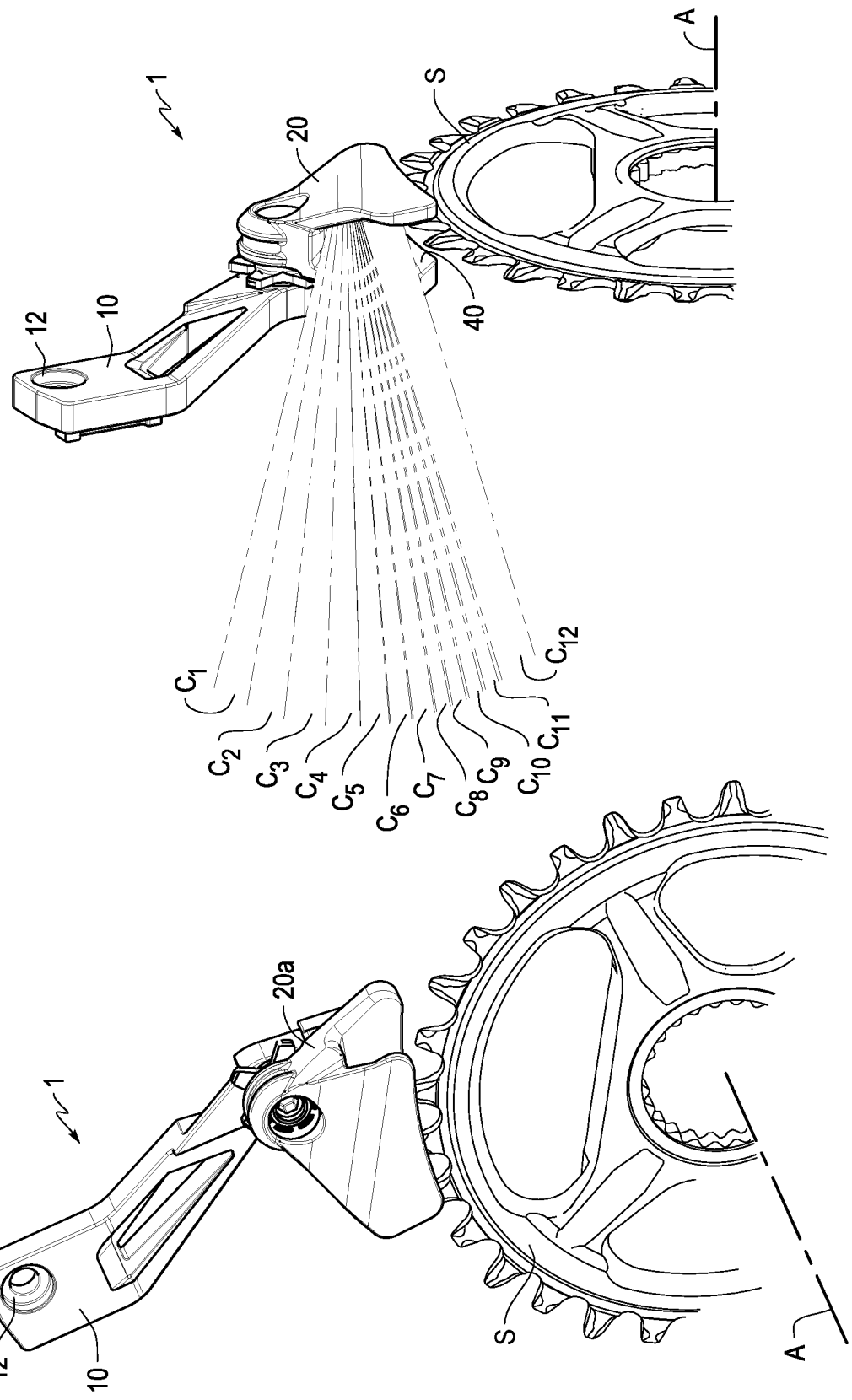

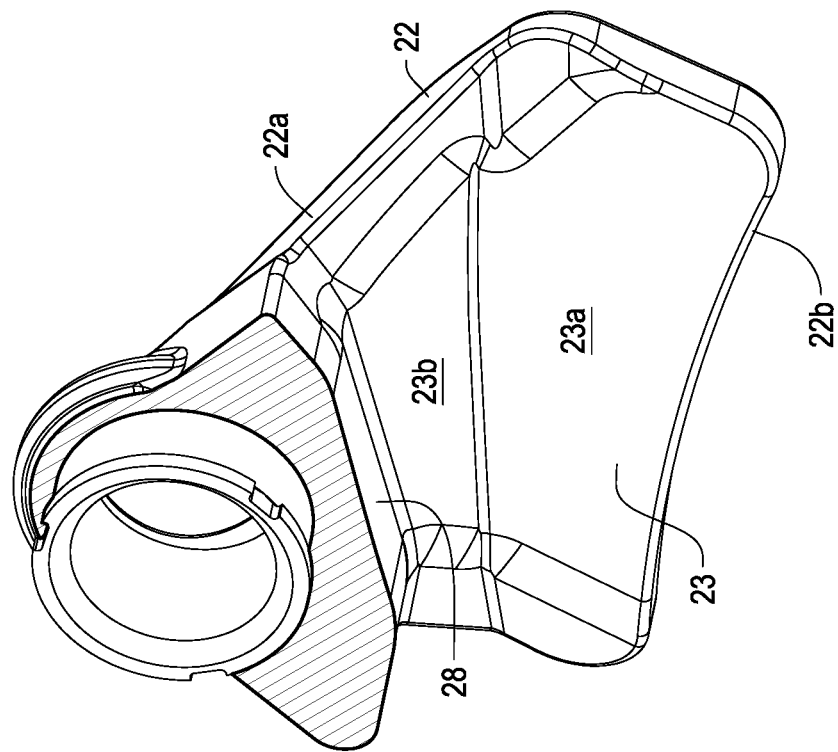
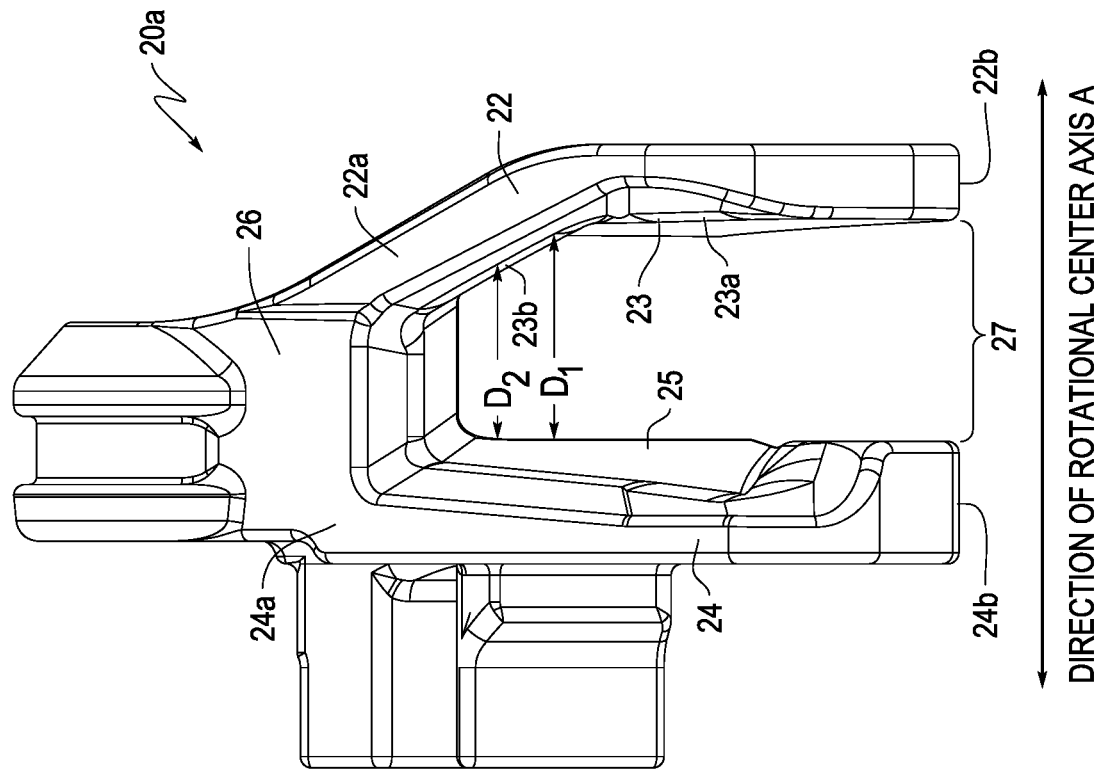
FIG. 4
FIG. 3

BICYCLE CHAIN GUIDE ASSEMBLY

CROSS-REFERENCE TO RELATED APPLICATION

This application is a Continuation-in-Part of U.S. application Ser. No. 15/795,761, filed Oct. 27, 2017, which is incorporated by reference herein in its entirety.

BACKGROUND

Recently mountain bicycles, cyclocross bicycles, and even road bicycles are utilizing drivetrains having only a solitary sprocket attached to the crankset. However, because a solitary sprocket has no need for a front derailleur, there is a risk that the chain can fall off (i.e., be "dropped") from the solitary sprocket. To help prevent the chain from being dropped from the solitary sprocket, chain guides have been used.

SUMMARY

Due to their shape, however, conventional chain guides may not fully prevent the chain from dropping and/or may interfere with the smooth movement of the chain. These problems can become more severe as the number of sprockets on a rear cassette of the bicycle increases. Further, conventional chain guides may not be easily adjustable. Thus, exemplary aspects of the broad inventive principles described herein provide bicycle chain guide assemblies that prevent the chain from dropping, allow for smooth movement of the chain, and/or are easily adjustable.

A first aspect of one or more exemplary embodiments provides a bicycle chain guide including a base and a chain guide. The base is configured to be mounted to a bicycle that includes a solitary sprocket having a rotational center axis. The chain guide is disposed above the solitary bicycle sprocket in a mounted state where the base is mounted to the bicycle. The chain guide includes a first guide plate, a second guide plate, and a bridge. The first guide plate has a first guiding surface. The second guide plate is closer to the base than the first guide plate and has a second guiding surface facing the first guiding surface to define a chain guiding slot between the first guiding surface and the second guiding surface. The bridge connects the first guide plate and the second guide plate.

In the first aspect, the first guiding surface includes a first part and a second part that is closer to the bridge than the first part. The second part is inclined relative to the first part as viewed from a direction perpendicular to the rotational axis. Because of this inclination, a distance between the second part and the second guiding surface in an axial direction parallel to the rotational center axis decreases from the first part toward the bridge.

According to the first aspect, a gap at the upper part of the chain guiding slot is reduced compared to a gap at the lower part of the chain guide. The reduced gap helps prevent chain disengagement from the teeth of the solitary sprocket, while the relatively larger gap at the lower part allows for the chain line to change from a smallest outer rear sprocket to a largest inner rear sprocket on a rear cassette across a large number of sprockets without contacting the chain guide.

According to a second aspect of one or more exemplary embodiments, the chain guide assembly of the first aspect is configured such that the first guide plate has a first upper end and a first lower end. The second guide plate has a second upper end and a second lower end. The first lower end is closer to the solitary bicycle sprocket than the first upper end in the mounted state, and the second lower end is closer to the solitary bicycle sprocket than the second upper end in the mounted state. The bridge connects the first upper end and the second upper end.

According to the second aspect, the gap at the upper part of the chain guiding slot is reduced compared to the gap at the lower part of the chain guide, which as explained above, helps prevent chain disengagement from the teeth of the solitary sprocket.

A third aspect of one or more exemplary embodiments provides a bicycle chain guide including a base and a chain guide. The base is configured to be mounted to a bicycle including a solitary sprocket having a rotational center axis. The chain guide is disposed above the solitary sprocket in a mounted state where the base is mounted to the bicycle. The chain guide includes a first guide plate and a second guide plate. The first guide plate has a first guiding surface. The second guide plate is closer to the base than the first guide plate and has a second guiding surface facing the first guiding surface to define a chain guiding slot between the first guiding surface and the second guiding surface. The second guide plate includes a protrusion protruding from the second guiding surface toward the first guiding surface.

According to the third aspect, it is possible to reduce a gap between the solitary sprocket and a second guide plate. This reduced gap helps prevent a drop of the chain off of the solitary sprocket and into the gap.

According to a fourth aspect of one or more exemplary embodiments, the chain guide assembly of the third aspect is configured such that the chain guide has an upstream end and a downstream end opposite to the upstream end with respect to a chain running direction in the mounting state. Further, the protrusion is disposed on the second guide plate at the upstream end of the chain guide.

According to the fourth aspect, it is possible to reduce a space between the bicycle chain and a second guide plate when the bicycle chain is engaged with a second smallest sprocket to fourth smallest sprocket of the rear cassette.

According to a fifth aspect of one or more exemplary embodiments, the chain guide assembly of either the third or fourth aspects is configured such that the second guide plate has an upper end and a lower end. The lower end is closer to the solitary bicycle sprocket than the upper end in the mounted state. Further, the protrusion is disposed on the lower end of the second guide plate.

According to the fifth aspect, it is possible to reduce a space between the bicycle chain and a second guide plate when the bicycle chain is engaged with a second to fourth sprocket of the rear cassette.

According to a sixth aspect of one or more exemplary embodiments, the chain guide assembly of any one of the third through fifth aspects is configured such that the first guide plate is free from the protrusion. This way, it is possible to avoid interference between the bicycle chain and the first guide plate.

According to a seventh aspect of one or more exemplary embodiments, the chain guide assembly of any one of the third through sixth aspects is configured such that the protrusion is configured to prevent a bicycle chain from dropping into a space between the solitary sprocket and the second guide plate in the mounted state. This way, chain disengagement from the teeth of the solitary sprocket is prevented.

An eighth aspect of one or more exemplary embodiments provides a bicycle chain guide including a base and a chain guide. The base is configured to be mounted to a bicycle including a solitary sprocket having a rotational center axis. The chain guide is disposed above the solitary sprocket in a mounted state where the base is mounted to the bicycle. The chain guide has an upstream end and a downstream end opposite to the upstream end with respect to a chain running direction in the mounted state. The chain guide includes a first guide plate and a second guide plate. The first guide plate has a first guiding surface. The second guiding plate is closer to the base than the first guide plate and has a second guiding surface facing the first guiding surface to define a chain guiding slot between the first guiding surface and the second guiding surface.

According to the eighth aspect, a first distance is defined between the first guiding surface and the second guiding surface in an axial direction parallel to the rotational center axis at the upstream end. A second distance is defined between the first guiding surface and the second guiding surface in an axial direction parallel to the rotational center axis at the downstream end. The first distance is larger than the second distance.

Due to the structure of the eighth aspect, the opening of the chain guide is wider at the upstream end than the downstream end. Because the rear cassette is upstream from the chain guide, the wider upstream end allows for the chain line to change from a smallest outer rear sprocket to a largest inner rear sprocket on a rear cassette across a large number of sprockets (e.g., 11, 12, or more) without contacting the chain guide, thereby allowing for smooth operation.

According to a ninth aspect of one or more exemplary embodiments, the chain guide assembly of the eighth aspect is configured such that the first guiding surface is inclined relative to the second guiding surface so that the first distance is larger than the second distance. This also allows for the chain line to change from a smallest outer rear sprocket to a largest inner rear sprocket on a rear cassette across a large number of sprockets without contacting the chain guide.

A tenth aspect of one or more exemplary embodiments provides a bicycle chain guide including a base and a chain guide. The base is configured to be mounted to a bicycle including a solitary sprocket having a rotational center axis. The solitary sprocket has a rotational center axis and an axial center plane bisecting the solitary sprocket in an axial direction parallel to the rotational center axis. The chain guide is disposed above the solitary bicycle sprocket in a mounted state where the base is mounted to the bicycle. The chain guide includes a first guide plate, a second guide plate, and a bridge. The first guide plate has a first guiding surface. The second guide plate is closer to the base than the first guide plate and has a second guiding surface facing the first guiding surface to define a chain guiding slot between the first guiding surface and the second guiding surface. The bridge connects the first guide plate and the second guide plate and has a third guiding surface facing the chain guiding slot.

According to the tenth aspect, the chain guide has an upstream end and a downstream end opposite to the upstream end with respect to a chain running direction in the mounted state. The third guiding surface is inclined relative to the axial center plane such that the third guiding surface is further away from the bicycle at its downstream end than at its upstream end.

According to the structure of the tenth aspect, the third surface is oriented to allow for an unencumbered chain line to the largest sprocket of the rear cassette, which is closest to the bicycle out of all of the rear sprockets. This is case even when the rear cassette has a large number of sprockets.

According to an eleventh aspect of one or more exemplary embodiments, the chain guide assembly of the tenth aspect is configured such that the second guide plate has an upper end and a lower end. The lower end is closer to the solitary bicycle sprocket in the mounted state. The third guiding surface is inclined relative to the lower end of the second guide plate such that a minimum distance between the third guiding surface and the lower end of the second guide plate decreases from the upstream end toward the downstream end.

The structure of the eleventh aspect allows for an unencumbered chain line to the largest sprocket of the rear cassette even when the rear cassette has a large number of sprockets.

According to a twelfth aspect of one or more exemplary embodiments, the chain guide assembly of either of the tenth or eleventh aspect is configured such that the first guide plate has a first upper end and a first lower end. The second guide plate has a second upper end and a second lower end. The first lower end is closer to the solitary bicycle sprocket than the first upper end in the mounted state, and the second lower end is closer to the solitary bicycle sprocket than the second upper end in the mounted state. The bridge connects the first upper end and the second upper end.

According to the structure of the twelfth aspect, there is an unencumbered chain line to the largest sprocket of the rear cassette even when the rear cassette has a large number of sprockets.

A thirteenth aspect of one or more exemplary embodiments provides a bicycle chain guide adjustment assembly including a base, a chain guide, and an adjusting member. The base is configured to be mounted to a bicycle. The adjusting member is rotatably coupled to at least one of the base and the chain guide around an adjusting axis such that rotation of the adjusting member around the adjusting axis moves a first position of the chain guide relative to the base in a direction parallel to the adjusting axis. The chain guide adjustment assembly is usable with any of the chain guides described in the first through twelfth aspects, or any other chain guide.

According to the structure of the thirtieth aspect, it is possible to adjust the first position of the chain guide. This, for example, allows the chain guide to be optimally located relative to a solitary bicycle sprocket to allow smooth operation and/or prevent chain drop.

According to a fourteenth aspect of one or more exemplary embodiments, the chain guide adjustment assembly of the thirteenth aspect is configured such that the chain guide includes a first guide plate and a second guide plate spaced apart from the first guide plate to define a chain guiding slot between the first guide plate and the second guide plate.

According to the fourteenth aspect, it is possible to prevent the chain from dropping off either side of the solitary sprocket.

According to a fifteenth aspect of one or more exemplary embodiments, the chain guide adjustment assembly of either of the thirteenth or fourteenth aspect is configured such that the adjusting member is engaged with one of the base and the chain guide. This structure makes it possible to adjust the first position of the chain guide.

According to a sixteenth aspect of one or more exemplary embodiments, the chain guide adjustment assembly of the thirteenth aspect is configured such that the adjusting member includes a first threaded portion that is threadedly engaged with the one of the base and the chain guide. This threaded engagement allows for smooth and continuous, rather than stepwise, adjustment of the first position so that the first position can be set precisely.

According to a seventeenth aspect of one or more exemplary embodiments, the chain guide adjustment assembly of the sixteenth aspect is configured such that the chain guide includes a second threaded portion that is threadedly engaged with the first threaded portion and is made of a metallic material. Accordingly, it is possible to improve the strength of the second threaded portion.

According to an eighteenth aspect of one or more exemplary embodiments, the chain guide adjustment assembly of either of the sixteenth or seventeenth aspects is configured such that the chain guide includes a first guide plate and a second guide plate spaced apart from the first guide plate to define a chain guiding slot between the first guide plate and the second guide plate. At least one of the first guide plate and the second guide plate is made of non-metallic material. Accordingly, it is possible to reduce the overall weight of the chain guide.

According to a nineteenth aspect of one or more exemplary embodiments, the chain guide adjustment assembly of any one of the thirteenth through eighteenth aspects further includes a fastener to fix the adjusting member to the other of the base and the chain guide. This way, after adjustment, the position of the chain guide can be fixed so that it is not inadvertently moved during use.

According to a twentieth aspect of one or more exemplary embodiments, the chain guide adjustment assembly of the nineteenth aspect is configured such that the adjusting member is configured to be rotatable in a state where the fastener is loose. This way, it is possible to selectively change a state of the adjusting member from adjustable to fixed.

According to a twenty-first aspect of one or more exemplary embodiments, the chain guide adjustment assembly of the nineteenth aspect further comprises a holding member to hold the fastener with respect to the chain guide in the direction parallel to the adjusting axis. This way, the holding member holds the fastener within the chain guide even when the fastener is loose so that at least the chain guide, holding member, and adjusting member remain connected even when the fastener is loose.

According to a twenty-second aspect of one or more exemplary embodiments, the chain guide adjustment assembly of the twenty-first exemplary embodiment is configured such that the holding member includes a first abutment to abut the fastener in a first axial direction parallel to the adjusting axis and a second abutment to abut the chain guide in a second axial direction opposite to the first axial direction with respect to the adjusting axis. This way, the holding member holds the fastener within the chain guide even when the fastener is loose so that at least the chain guide, holding member, and adjusting member remain connected even when the fastener is loose.

According to a twenty-third aspect of one or more exemplary embodiments, the chain guide adjustment assembly of the twenty-second exemplary embodiment is configured such that the holding member includes a third abutment to abut the fastener in the second axial direction parallel to the adjusting axis and a fourth abutment to abut the adjusting member in the first axial direction. This way, the holding member reliably transfers the axial force from tightening the fastener to the adjustment member so that the chain guide and adjusting member remain in a firmly fixed position along the adjusting axis when the fastener is tightened.

According to a twenty-fourth aspect of one or more exemplary embodiments, the chain guide adjustment assembly of the twenty-second exemplary embodiment is configured such that the third abutment includes a tapered surface such that the holding member expands in a radial direction with respect to the adjusting axis as the fastener is fastened to the base. By expanding radially, the holding member securely contacts the chain guide such that there is no movement of the adjustment member relative to the fastening member in the radial direction that might result in misalignment or rattling of the adjustment member.

According to a twenty-fifth aspect of one or more exemplary embodiments, the chain guide adjustment assembly of the twenty-second exemplary embodiment is configured such that the holding member includes a fifth abutment to abut the chain guide in a radial direction with respect to the adjusting axis in a fixed state where the fastener fixes the adjusting member to the base. This way, the holding member securely contacts the chain guide in the radial direction such that there is no movement of the adjustment member relative to the fastening member in the radial direction that might result in misalignment or rattling of the adjustment member.

According to a twenty-sixth aspect of one or more exemplary embodiments, the chain guide adjustment assembly of the twenty-first exemplary embodiment is configured such that the holding member is disposed between the fastener and the chain guide in a radial direction with respect to the adjusting axis. This way, the holding member can reliably transfer the axial force from tightening the fastener to the adjustment member while expanding radially to prevent unintended radial movement of the chain guide.

According to a twenty-seventh aspect of one or more exemplary embodiments, the chain guide adjustment assembly of any one of the thirteenth to twentieth aspects is configured such that the adjusting member is disposed between the base and the chain guide in the direction parallel to the adjusting axis. This way, it is possible to couple the adjusting member to both the chain guide and the base.

According to a twenty-eighth aspect of one or more exemplary embodiments, the chain guide adjustment assembly of any one of the thirteenth to twenty-first aspects is configured such that the adjusting member includes an operating portion manually operable to rotate the adjusting member. This way, it is possible to manually adjust the first position of the chain guide.

According to a twenty-ninth aspect of one or more exemplary embodiments, the chain guide adjustment assembly of any one of the thirteenth to twenty-first aspects is configured such that the adjusting member includes an operating extension extending radially outward with respect to the adjusting axis. This way, it is easy for a user to access and operate the adjusting member.

According to a thirtieth aspect of one or more exemplary embodiments, the chain guide adjustment assembly of any one of the thirteenth to twenty-third aspects includes a rotation preventing structure configured to prevent relative rotation between the chain guide and the base around the adjusting axis. This structure prevents the chain guide from moving relative to the base in a direction around the adjusting axis.

According to a thirty-first aspect of one or more exemplary embodiments, the chain guide adjustment assembly of any one of the thirteenth to twenty-third aspects is configured such that the base includes an adjusting slot extending in a direction non-parallel to the adjusting axis. The adjusting slot permits adjustment of a second position of the chain guide along the adjusting slot. This structure makes it possible to adjust a second position of the chain guide in a direction that is different than a direction of the adjusting axis.

BRIEF DESCRIPTION OF THE DRAWINGS

Exemplary embodiments are described below with reference to the following drawings:

FIG. 1 shows aspects of a first exemplary embodiment of a bicycle chain guide assembly mounted above a solitary sprocket;

FIG. 2 shows different chain lines of a bicycle chain when the first exemplary embodiment of the bicycle chain guide assembly is used with a rear cassette having twelve sprockets;

FIG. 3 shows aspects of the bicycle chain guide assembly of according to the first exemplary embodiment in the mounted state looking in a direction perpendicular to the rotational axis from an upstream end towards a downstream end with respect to a chain running direction;

FIG. 4 shows a partial view of the chain guide of the first exemplary embodiment showing the first guide plate;

DETAILED DESCRIPTION OF EXEMPLARY EMBODIMENTS

Figure 6:
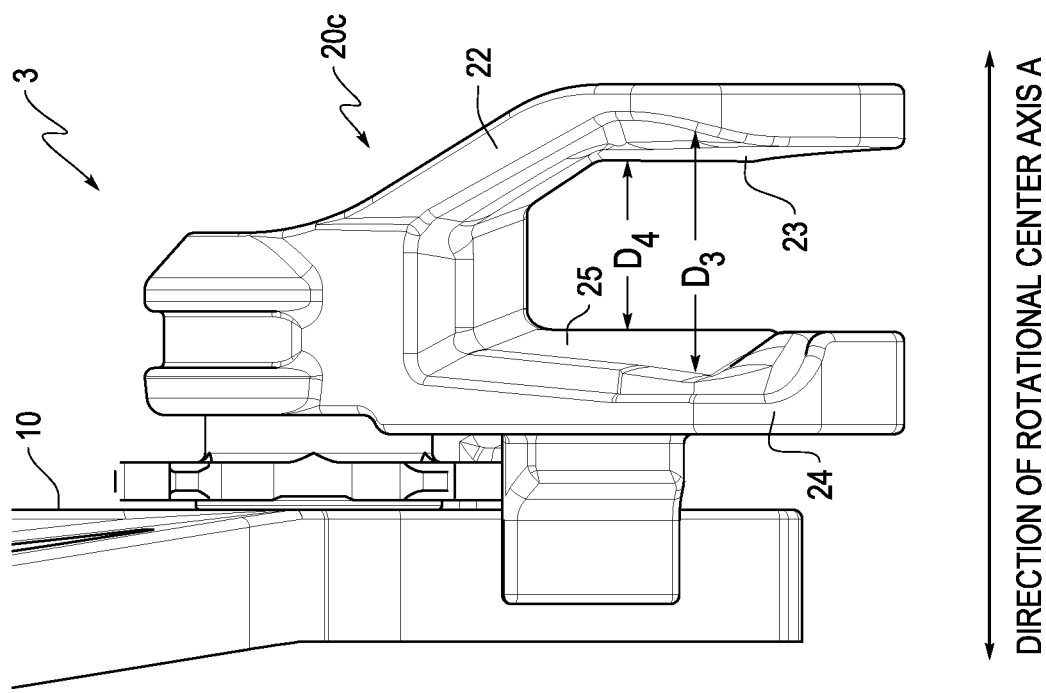
FIG. 6 shows aspects of the bicycle chain guide assembly of according to a third exemplary embodiment looking from an upstream end towards a downstream end with respect to a chain running direction in the mounted state.

Exemplary embodiments of a bicycle chain guide assembly will be described below with reference to the drawings. It will be apparent to the skilled artisan in the bicycle field from this disclosure that the following descriptions of exemplary embodiments are provided as examples only and need not limit the broad inventive principles described herein or included in the appended claims.

FIG. 1 shows aspects of a first exemplary bicycle chain guide assembly 1, which includes base 10 and chain guide 20a. The base 10 is configured to be mounted to a bicycle that includes solitary sprocket S having a rotational center axis A. The solitary sprocket S, for example, can be attached to one end of a crank arm of the bicycle (not shown). For example, the base 10 could be mounted to the seat tube of the bicycle frame using mounting hole 12.

As shown in FIGS. 1 and 2, the chain guide 20a is disposed above the solitary sprocket S in a mounted state where the base is mounted to the bicycle so that a chain that is located on the solitary sprocket S passes through the chain guide 20a. According to the example shown in FIG. 2, the chain guide 20a is mounted to a bicycle having a rear cassette on the rear wheel (not shown) with 12 differently sized rear sprockets. Although, it can be used with a cassette having more or less sprockets. When the chain is engaged with each of the 12 different rear sprockets it follows a different path from the solitary sprocket to the rear sprocket. Each of these different paths is commonly referred to as a "chain line." FIG. 2 shows each of the 12 different chain lines $C_1$-$C_{12}$ respectively corresponding to each of the 12 different rear sprockets. As can be seen in FIG. 2, the chain line moves down and away from the bicycle as it transitions from $C_1$ (corresponding to the largest rear sprocket located closest to the rear wheel) to $C_{12}$ (corresponding to the smallest rear sprocket located furthest from the rear wheel).

FIG. 3 shows the structure of the chain guide 20a of the first exemplary embodiment looking from an upstream end towards a downstream end with respect to a chain running direction in the mounted state as viewed from a direction perpendicular to the rotational axis A. As shown in FIG. 3, the chain guide 20a includes a first guide plate 22, a second guide plate 24, and a bridge 26. The first guide plate 22 has a first guiding surface 23. The second guide plate 24 is closer to the base 10 than the first guide plate 22 and has a second guiding surface 25 facing the first guiding surface 23 to define a chain guiding slot 27 between the first guiding surface 23 and the second guiding surface 25. The bridge 26 connects the first guide plate 22 and the second guide plate 24.

As shown in FIGS. 3 and 4, the first guiding surface 23 includes a first part 23a and a second part 23b that is closer to the bridge 26 than the first part 23a. Therefore, the second part 23b is disposed above the first part 23a in the mounted state. The second part 23b is inclined relative to the first part 23a as viewed from the direction perpendicular to the rotational axis A. Specifically, the second part 23b is inclined relative to the first part 23a as viewed from an upstream end towards a downstream end with respect to a chain running direction in the mounted state. Because of this inclination, a distance between the second part 23b and the second guiding surface 25 in an axial direction parallel to the rotational center axis decreases from the first part 23a toward the bridge 26. The distances $D_1$ and $D_2$ in FIG. 3 are the distances measured between the second part 23b and the second guiding surface 25 in the axial direction, and a measuring location of the distance $D_1$ is disposed below a measuring location of the distance $D_2$. As a result, for example, distance $D_1$ shown in FIG. 3 is longer than distance $D_2$.

As also shown in FIG. 3, the first guide plate 22 can have a first upper end 22a and a first lower end 22b. The second guide plate 24 can have a second upper end 24a and a second lower end 24b. The first lower end 22b is closer to the solitary bicycle sprocket S than the first upper end 22a in the mounted state, and the second lower end 24b is closer to the solitary bicycle sprocket S than the second upper end 24a in the mounted state. In this configuration, the bridge 26 connects the first upper end 22a and the second upper end 24a. As shown in FIG. 3, the first lower end 22b and the second lower end 24b are not connected to each other so that an opening to receive the solitary sprocket S is formed between the first lower end 22b and the second lower end 24b.

Figure 5:
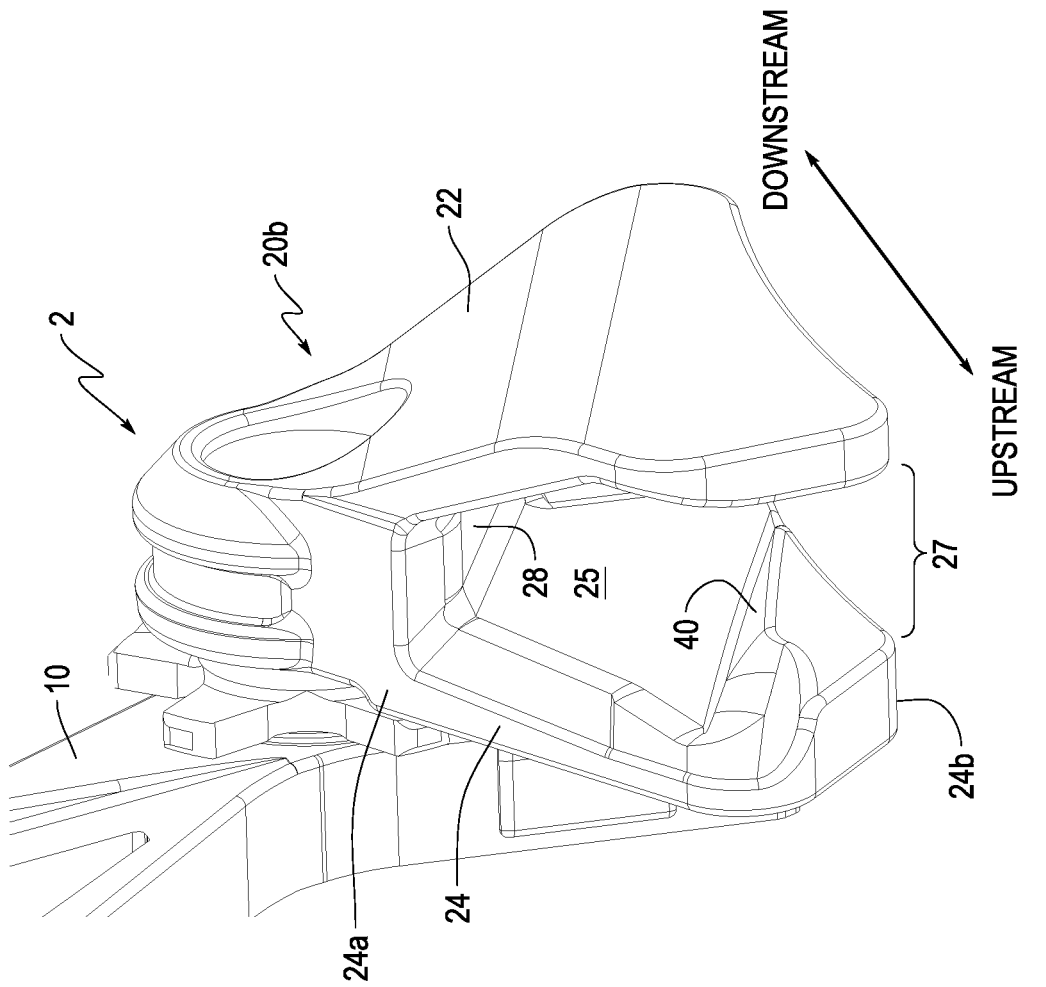
FIG. 5 shows aspects of the bicycle chain guide assembly of according to a second exemplary embodiment.

FIG. 5 shows aspects of a second exemplary embodiment of a bicycle chain guide assembly 2. Where the structure is similar to the structure described with respect to the first exemplary embodiment, the same reference numerals are used. Further, to the extent structure expressly described as part of the second exemplary embodiment is shown in the figures used to describe the first exemplary embodiment, but was not expressly described with respect to the first exemplary embodiment, that structure need not be present in the first embodiment.

As shown in FIG. 5, like the chain guide assembly 1 of the first exemplary embodiment, the chain guide assembly 2 of the second exemplary embodiment includes a base 10 and a chain guide 20b. The base 10 is configured to be mounted to a bicycle (not shown). Like in the first embodiment, the bicycle includes a solitary sprocket S having a rotational center axis A. Also like the first embodiment, the chain guide 20b is disposed above the solitary sprocket S in a mounted state where the base is mounted to the bicycle. The chain guide 20b includes a first guide plate 22 and a second guide plate 24. The first guide plate 22 has a first guiding surface 23 (see FIGS. 3 and 4). The second guide plate 24 is closer to the base 10 than the first guide plate 22 and has a second guiding surface 25 facing the first guiding surface 23 to define a chain guiding slot 27 between the first guiding surface 23 and the second guiding surface 25. A main feature of the second exemplary embodiment is that the second guide plate 24 includes a protrusion 40 protruding from the second guiding surface 25 toward the first guiding surface 23. By contrast, the first exemplary embodiment need not include such a protrusion 40.

As shown in FIG. 5, the chain guide 20b has an upstream end and a downstream end opposite to the upstream end with respect to a chain running direction in the mounting state. The protrusion 40 can, for example, be disposed on the second guide plate 24 at the upstream end of the chain guide 20b. Like in the first embodiment, the second guide plate 24 has an upper end 24a and a lower end 24b. The lower end 24b is closer to the solitary bicycle sprocket S than the upper end 24a in the mounted state. As shown in FIG. 5, the protrusion can be disposed on the lower end 24b of the second guide plate 24. Also, as shown in FIG. 5, the protrusion 40 can be located only on the second guide plate 24. That is, that first guide plate 22 can be free from the protrusion 40. However, it is possible to form the protrusion on the first guiding surface 23 of the first guide plate 22. As can be seen in FIG. 5, an upper edge of the protrusion is inclined with respect to the lower edge 24b of the second guide plate 24. Specifically, the upper edge of the protrusion gets closer to the lower edge 24b of the second guide plate 24 from the upstream end toward the downstream end of the chain guide 20b. Consequently, a chain guiding groove is formed between the protrusion 40 and the bridge 28. This chain guiding groove extends along the chain running direction from the upstream end toward the downstream end of the chain guide 20b in the mounted state.

By virtue of its structure, the protrusion 40 is configured to prevent a bicycle chain from dropping into a space between the solitary sprocket S and the second guide plate 24 in the mounted state. This is because, for example, as shown in FIG. 2, the protrusion 40 makes the lower end 24b of the second guide plate 24 relatively closer to the solitary sprocket S so that it is difficult for a chain to fit into the space between the protrusion 40 and the solitary sprocket S.

FIG. 6 shows aspects of a third exemplary embodiment of a bicycle chain guide assembly 3. Where the structure is similar to the structure described with respect to either the first exemplary embodiment or the second exemplary embodiment, the same reference numerals are used. Further, to the extent structure expressly described as part of the third exemplary embodiment is shown in figures used to describe the other embodiments, but was not expressly described with respect to those embodiments, that structure need not be present in those other embodiments.

FIG. 6 is a view of the chain guide assembly 3 of the third exemplary embodiment looking from an upstream end towards a downstream end with respect to a chain running direction in the mounted state. As shown in FIG. 6, like the chain guide assemblies of the other exemplary embodiments, the chain guide assembly 3 of the third exemplary embodiment includes a base 10 and a chain guide 20c. The base 10 is configured to be mounted to a bicycle (not shown) including a solitary sprocket S having a rotational center axis A (see FIGS. 1 and 2). The chain guide 20c is disposed above the solitary sprocket S in a mounted state where the base 10 is mounted to the bicycle. The chain guide 20c includes a first guide plate 22 and a second guide plate 24. The first guide plate 22 has a first guiding surface 23. The second guiding plate 24 is closer to the base 10 than the first guide 22 plate and has a second guiding surface 25 facing the first guiding surface 23 to define a chain guiding slot 27 between the first guiding surface 23 and the second guiding surface 25.

As shown in FIG. 6, a distance $D_3$ between the first guiding surface 23 and the second guiding surface 25 in an axial direction parallel to the rotational center axis A at the upstream end is larger than a distance $D_4$ between the first guiding surface 23 and the second guiding surface 25 in an axial direction parallel to the rotational center axis A at the downstream end.

As shown in FIG. 6, one way to cause distance $D_3$ to be greater than distance $D_4$ is to configure the first guiding surface 23 so that it is inclined relative to the second guiding surface 25. In the third exemplary embodiment, both of the first guiding surface 23 and the second guiding surface 25 are inclined relative to an axial center plane P (see FIG. 7) bisecting a solitary sprocket S in the axial direction in the mounted state. Specifically, each of a distance between the first guiding surface 23 and the axial center plane, and a distance between the second guiding surface 25 and the axial center plane P decreases from the upstream end toward the downstream end. An inclination angle of the second guiding surface 25 relative to the axial center plane P is larger than an inclination angle of the first guiding surface 23 relative to the axial center plane P.

Figure 7:
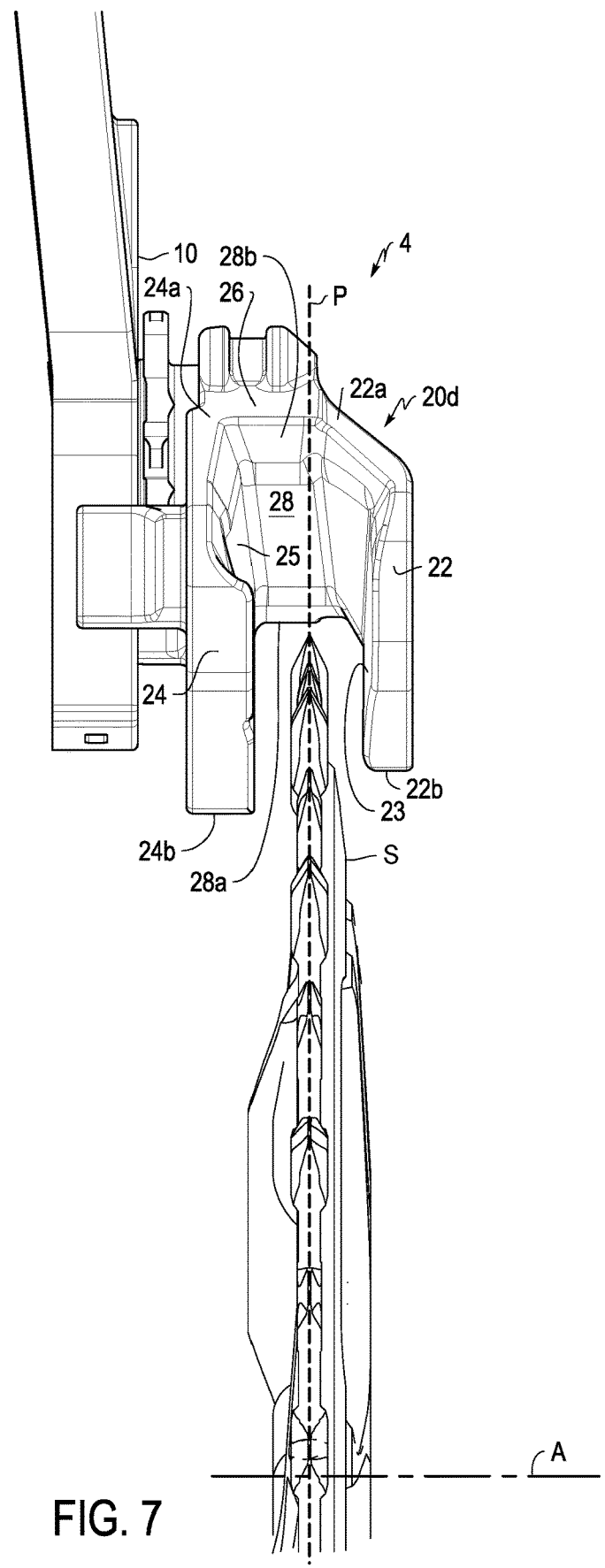
FIG. 7 is an enlarged view looking from an upstream end to a downstream end an showing aspects of the bicycle chain guide assembly of according to a fourth exemplary embodiment.

FIG. 7 shows aspects of a fourth exemplary embodiment of a bicycle chain guide assembly 4. Where the structure is similar to the structure described with respect to earlier described exemplary embodiments, the same reference numerals are used. Further, to the extent structure expressly described as part of the fourth exemplary embodiment is shown in figures used to describe the other embodiments, but was not expressly described with respect to those embodiments, that structure need not be present in those other embodiments.

FIG. 7 is a view of the chain guide assembly 4 of the fourth exemplary embodiment looking from an upstream end towards a downstream end with respect to a chain running direction in the mounted state. As shown in FIG. 7, like the chain guide assemblies of the other exemplary embodiments, the chain guide assembly 4 of the fourth exemplary embodiment includes a base 10 and a chain guide 20d. The base 10 is configured to be mounted to a bicycle (not shown) including a solitary sprocket S having a rotational center axis A and an axial center plane P bisecting the solitary sprocket in an axial direction parallel to the rotational center axis A. The chain guide 20d is disposed above the solitary bicycle sprocket S in a mounted state where the base is mounted to the bicycle. The chain guide 20d includes a first guide plate 22, a second guide plate 24, and a bridge 26. The first guide plate 22 has a first guiding surface 23. The second guide plate 24 is closer to the base 10 than the first guide plate 22 and has a second guiding surface 25 facing the first guiding surface 23 to define a chain guiding slot 27 (see FIG. 6) between the first guiding surface 23 and the second guiding surface 25. The bridge 26 connects the first guide plate 22 and the second guide plate 24 and has a third guiding surface 28 facing the chain guiding slot 27. The third guiding surface 28 is inclined relative to the axial center plane P such that the third guiding surface 28 is further away from the bicycle at its downstream end 28a than at its upstream end 28b. The downstream end 28a of the third guiding surface 28 and the upstream end 28b of the third guiding surface 28 have axial ends that are disposed closer to the bicycle than the axial center plane P of the solitary bicycle sprocket S when the chain guide 20d is in the mounted state.

As shown in FIG. 7, the second guide plate 24 has an upper end 24a and a lower end 24b. The lower end 24b is closer to the solitary bicycle sprocket S in the mounted state. As shown, for example in FIG. 5, the third guiding surface 28 of the fourth embodiment can be inclined relative to the lower end 24b of the second guide plate 24 such that a minimum distance between the third guiding surface 28 and the lower end 24b of the second guide plate 24 decreases from the upstream end toward the downstream end.

Also as shown in FIG. 7, the first guide plate 22 has a first upper end 22a and a first lower end 22b. The first lower end 22b can be closer to the solitary bicycle sprocket S than the first upper end 22a in the mounted state, and the second lower end 24b can be closer to the solitary bicycle sprocket S than the second upper end 24a in the mounted state. The bridge 26 connects the first upper end 22a and the second upper end 24a. The second lower end 24b is longer than the third guiding surface 28 in the chain running direction.

Figure 9:
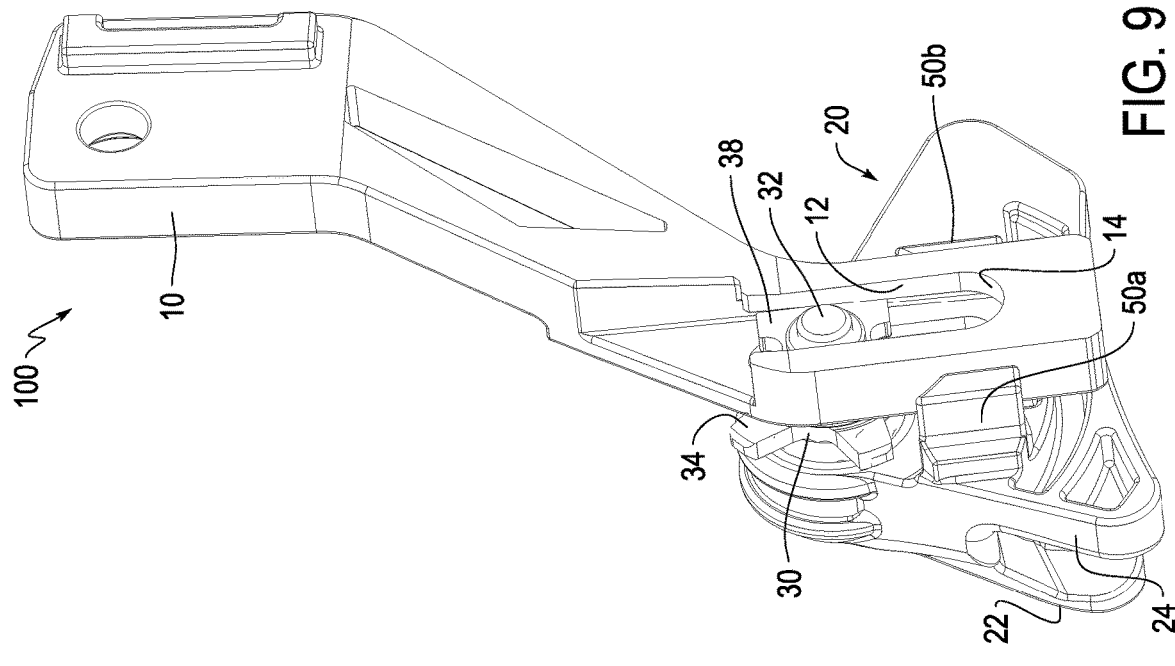
FIG. 9 is an enlarged perspective view of the first exemplary embodiment of the chain guide adjustment assembly.
Figure 8:
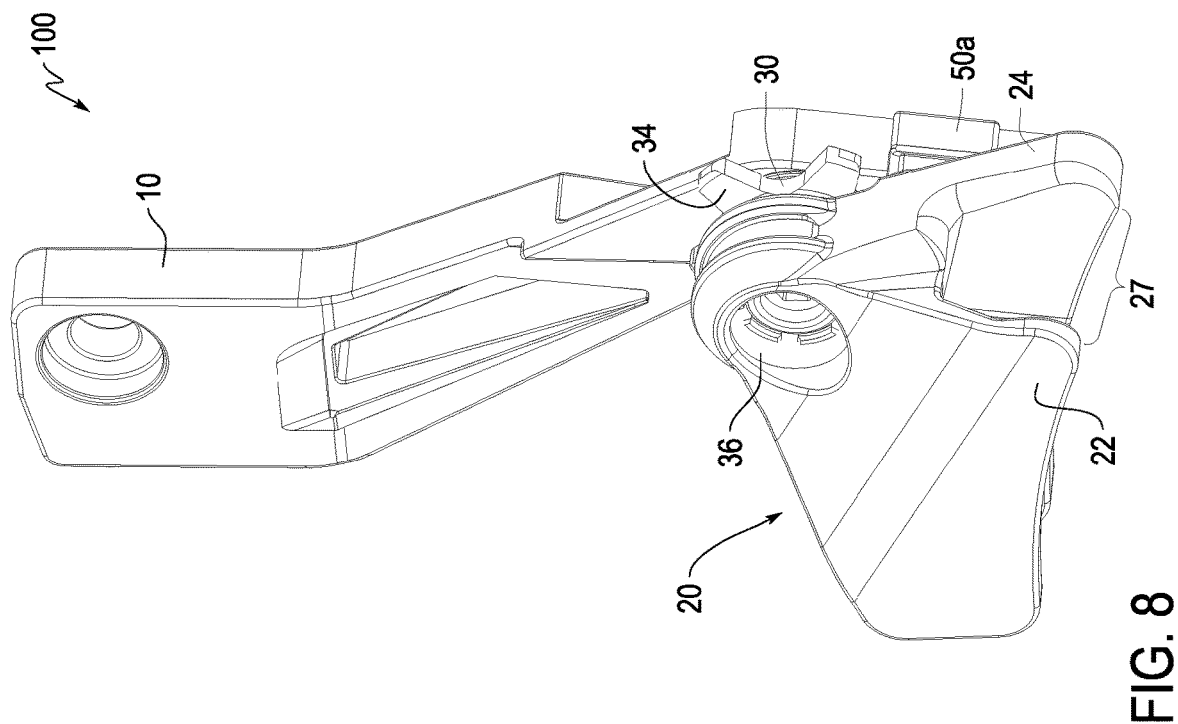
FIG. 8 is an enlarged perspective view showing aspects of a first exemplary embodiment of the chain guide adjustment assembly.
Figure 10:
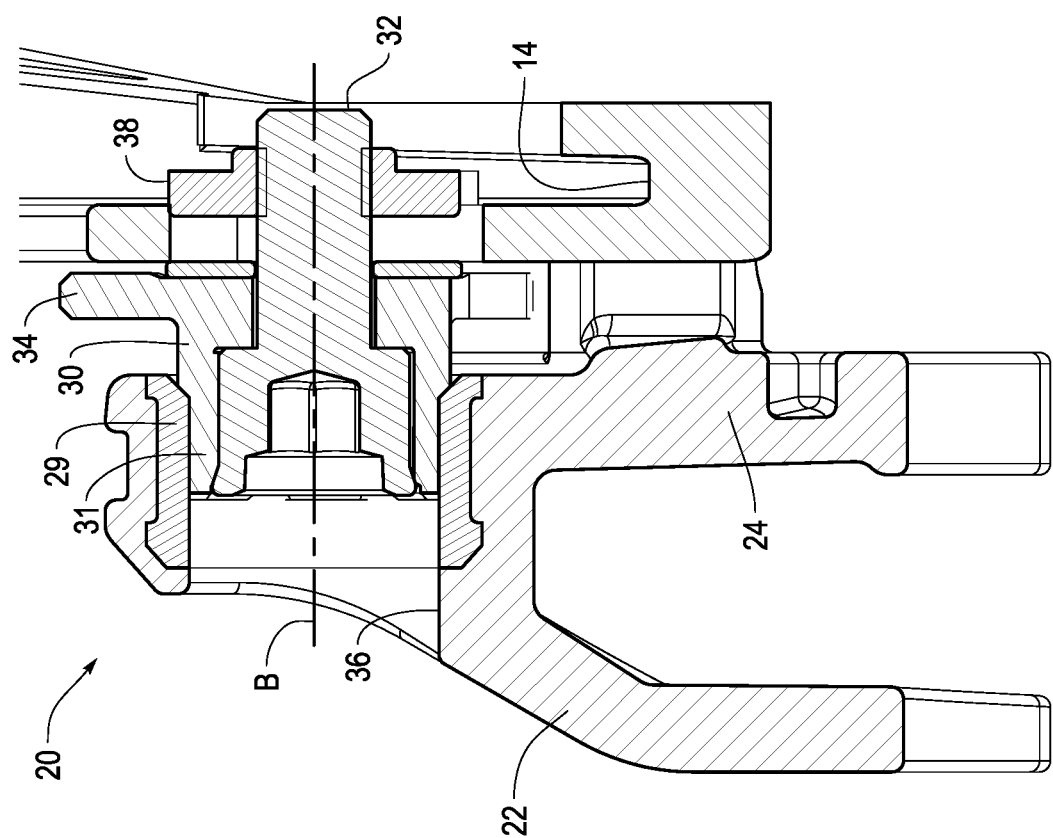
FIG. 10 is a cross-sectional view of the first exemplary embodiment of the chain guide adjustment assembly.

FIGS. 8-10 show aspects of a first exemplary embodiment of a bicycle chain guide adjustment assembly 100. Because the bicycle chain guide adjustment assembly 100 can be used with similar components to those described above with respect to the exemplary embodiments of the bicycle chain guide assemblies 1, 2, 3, 4, for ease of explanation, the same reference numerals will be used to identify similar structures. However, the bicycle chain guide adjustment assembly 100 is not limited by the specific structural features of the embodiments described above. For example, the bicycle chain guide adjustment assembly 100 can be used with any of the chain guides 20a, 20b, 20c, or 20d, described above, or with any other chain guide. Thus, the more generic reference numeral 20 is used in the following description to denote the chain guide.

As shown in FIGS. 8-10, the bicycle chain guide adjustment assembly 100 includes a base 10, a chain guide 20, and an adjusting member 30. The base 10 is configured to be mounted to a bicycle (not shown). As shown in FIG. 10, the adjusting member 30 is rotatably coupled to the chain guide 20 around an adjusting axis B such that rotation of the adjusting member 30 around the adjusting axis B moves a first position of the chain guide relative to the base 10 in a direction parallel to the adjusting axis B. In the illustrated embodiment, the adjusting axis B extends along the rotational center axis A of the solitary bicycle sprocket S in the mounted state. Specifically, the adjusting axis B is substantially parallel to the rotational center axis. However, the adjusting member 30 can alternatively be rotatably coupled to the base 10 around the adjusting axis B such that rotation of the adjusting member 30 around the adjusting axis B moves the first position of the chain guide 20 relative to the base 10 in a direction parallel to the adjusting axis B. Further, as shown in FIGS. 8-10, the adjusting member 30 is disposed between the base 10 and the chain guide 20 in the direction parallel to the adjusting axis B. However, the adjusting member 30 could be disposed in another location, for example, such that the chain guide 20 is disposed between the adjusting member 30 and the base 10 in the direction parallel to the adjusting axis B.

As shown in FIGS. 8 and 9, the chain guide 20 can include a first guide plate 22 and a second guide plate 24 spaced apart from the first guide plate 22 to define a chain guiding slot 27 between the first guide plate 22 and the second guide plate 24. Either or both of the first guide plate 22 and a second guide plate 24 can be made of a non-metallic material. Specifically, the first guide plate 22 and the second guide plate 24 are made of plastic material, such as polycarbonate, polyacetal, etc. The chain guide 20 can also include a rotation preventing structure configured to prevent relative rotation between the chain guide 20 and the base 10 around the adjusting axis B. For example, the chain guide 20 can include a first projection 50a, a second projection 50b, or both, that are provided below the adjusting member 30 in the mounted state, extend from the chain guide 20 in a direction parallel to the adjusting axis B, and that contact an outer periphery of the base 10. The rotation preventing structure can be integrally provided as part of the chain guide 20. Specifically, the first projection 50a and the second projection 50b project from the second guide plate 24 toward the base member 10. More specifically, the first projection 50a and the second projection 50b are provided on an axial side surface of the second guide plate 24 so that a space is provided between the first projection 50a and the second projection 50b. The base 10 is provided in the space between the first projection 50a and the second projection 50b so that the first projection 50a and the second projection 50b make surface contact with the outer periphery of the base 10. Therefore, the first projection 50a and the second projection 50b can guide the base during an adjustment of the chain guide 20 relative to the base 10 in the direction parallel to the adjusting axis B. Alternatively, the rotation preventing structure can be integrally provided as part of the base and contact the chain guide.

The adjusting member 30 can be engaged with the chain guide 20. For example, as shown in FIG. 10, the adjusting member 30 can include a first threaded portion 31 that is threadedly engaged with the chain guide 20. Also, as shown in FIG. 10, the chain guide 20 can include a second threaded portion 29 that is threadedly engaged with the first threaded portion 31. In this configuration, the second threaded portion 29 can be made of a metallic material that can be embedded into a part of the chain guide 20. In such a case, the second threaded portion can have knurls on an outer surface to prevent either rotational or translational movement once it is embedded in the chain guide 20. Alternatively, although not shown in the drawings, adjusting member 30 can instead be engaged with the base 10. For example, the adjusting member 30 can include a threaded portion that is threadedly engaged with the base 10. In such a case, the base 10 can include a second threaded portion that engages with the first threaded portion 31.

As shown in FIGS. 9 and 10, the chain guide adjustment assembly 100 can further include a fastener 32 to fix the adjusting member 30 to the base 10. When the fastener 32 is loose, the adjusting member 30 can rotate, and when the fastener 32 is tight, the adjusting member 30 is prevented from rotating. In other words, in a state in which the fastener is tight, a relative position of the chain guide 20 and the base 10 is fixed. The chain guide 20 can include a tool access hole 36 to allow a tool, such as a hexagonal wrench or a screw driver, to engage with the fastener 32. A tool engagement portion of the fastener 32 faces an opening of the tool access hole 36. Therefore, the tool can be inserted from outside of the chain guide 20. Further, a nut 38 could be provided on an opposite side of the base 10 with respect to the chain guide 20 to engage with the fastener 32. The nut 38 could be provided in an adjusting slot 12 on the base 10 that holds the nut 38. The adjusting slot 12 has a bottom surface 14 that prevents the nut 38 from dropping out of the adjusting slot 12. The adjusting slot 12 has one end in a longitudinal direction of the adjusting slot 12 with the bottom surface 14, and the other end with an opening to receive the nut 38. In the alternative configuration where the adjusting member 30 is threadedly engaged with the base 10 without using the nut 37. In another alternative configuration, the fastener 32 would instead fix the adjusting member 30 to the chain guide 20 and the base 10 would include a tool access hole.

As shown in FIGS. 8 and 9, the adjusting member 30 can include an operating portion such as an operating extension 34 that extends radially outward and is manually operated to rotate the adjusting member 30. Although the adjusting member 30 is shown with multiple radially extending operating extensions 34 that are spaced apart from one another in a circumferential direction of the adjusting axis B, it could have only a single operating portion, or it could be an operating dial that lacks any extensions. (As used herein, the term "dial," is not intended to encompass a bolt that is manipulated with a tool).

As shown in FIG. 9, the adjusting slot 12 extends in a direction non-parallel to the adjusting axis B, and the adjusting axis B can pass through the adjusting slot 12. This way, the adjusting slot permits adjustment of a second position of the chain guide 20 along the adjusting slot. In the example of FIG. 9, the adjusting slot 12 extends in a direction that allows the chain guide 20 to be moved toward and away from the solitary sprocket S. Therefore, it is possible to adjust a clearance between teeth of the solitary sprocket S and the third guiding surface in a radial direction of the rotational center axis A.

Figure 13:
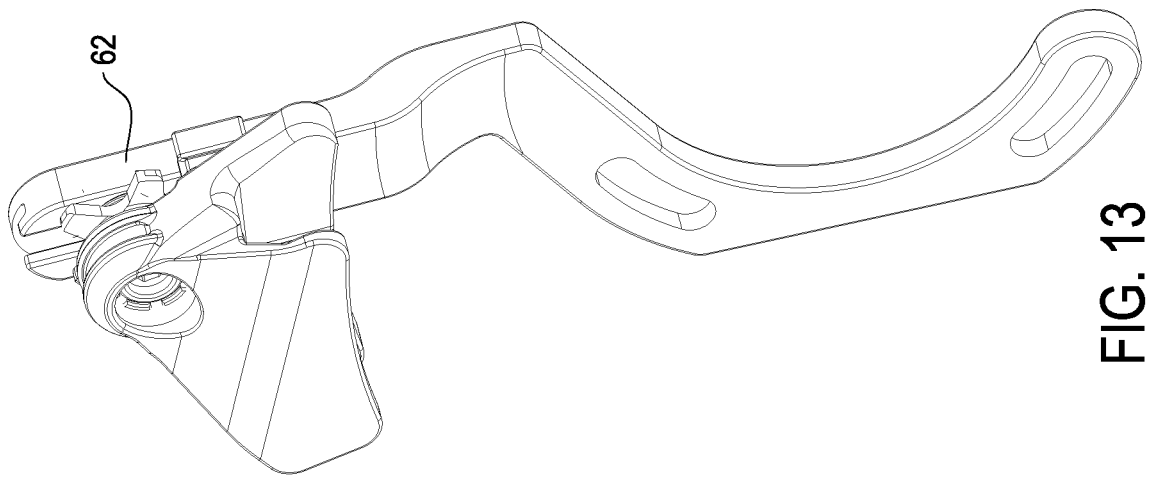
FIGS. 11-13 show alternative structures for the base member.
Figure 12:
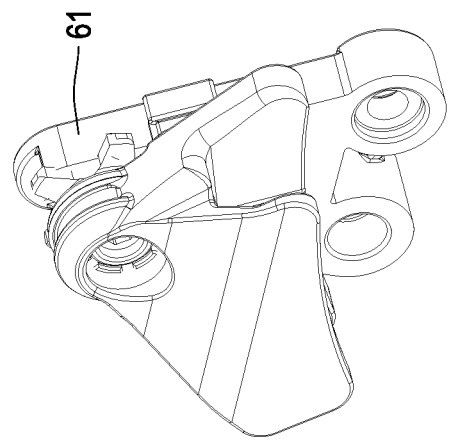
Figure 11:
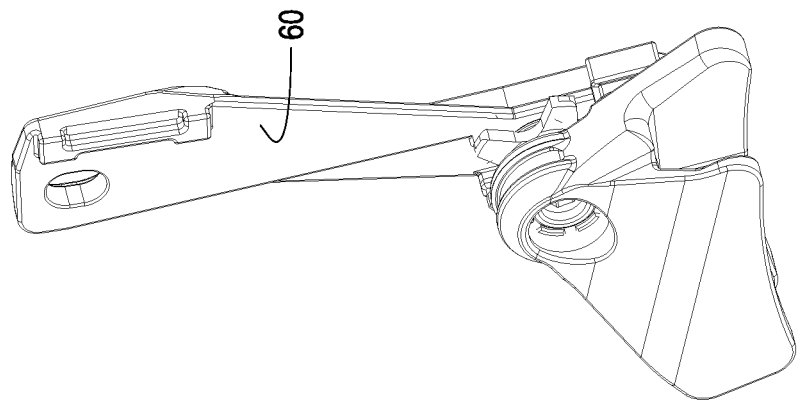

Although all of the above exemplary embodiments are depicted using the same style of base 10, different styles of bases can be used in each embodiment. FIGS. 11-13 show examples of some different styles of bases that can be used in each embodiment. Base 60 in FIG. 11 is another style of base that attaches to a seat tube area of a bicycle frame. Base 61 in FIG. 12 has a mounting portion that is disposed below the chain guide. Base 62 in FIG. 12 is attached around a bottom bracket hanger of the bicycle frame.

Figure 14:
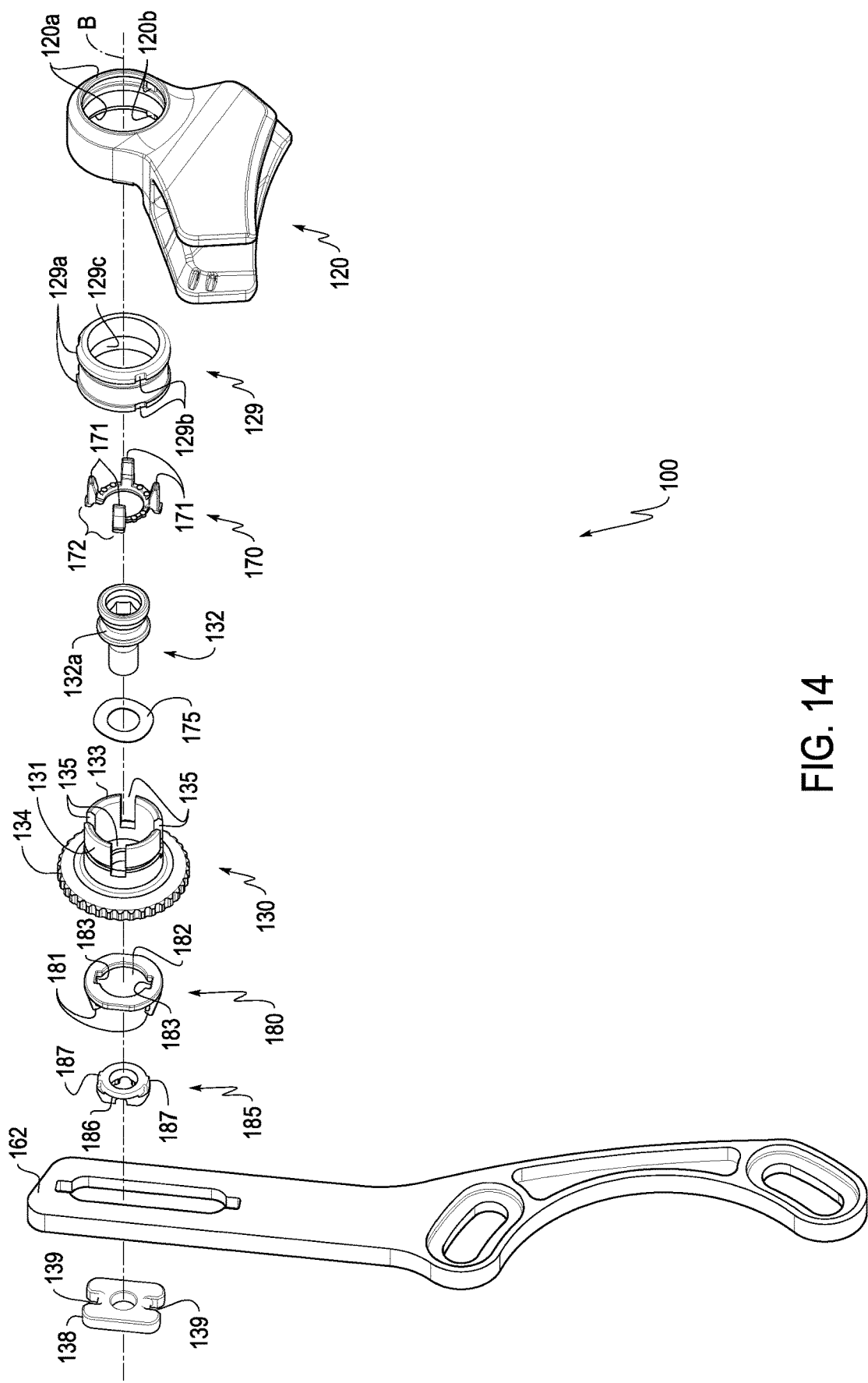
FIG. 14 shows an exploded view of a second exemplary embodiment of the chain guide adjustment assembly.
Figure 15:
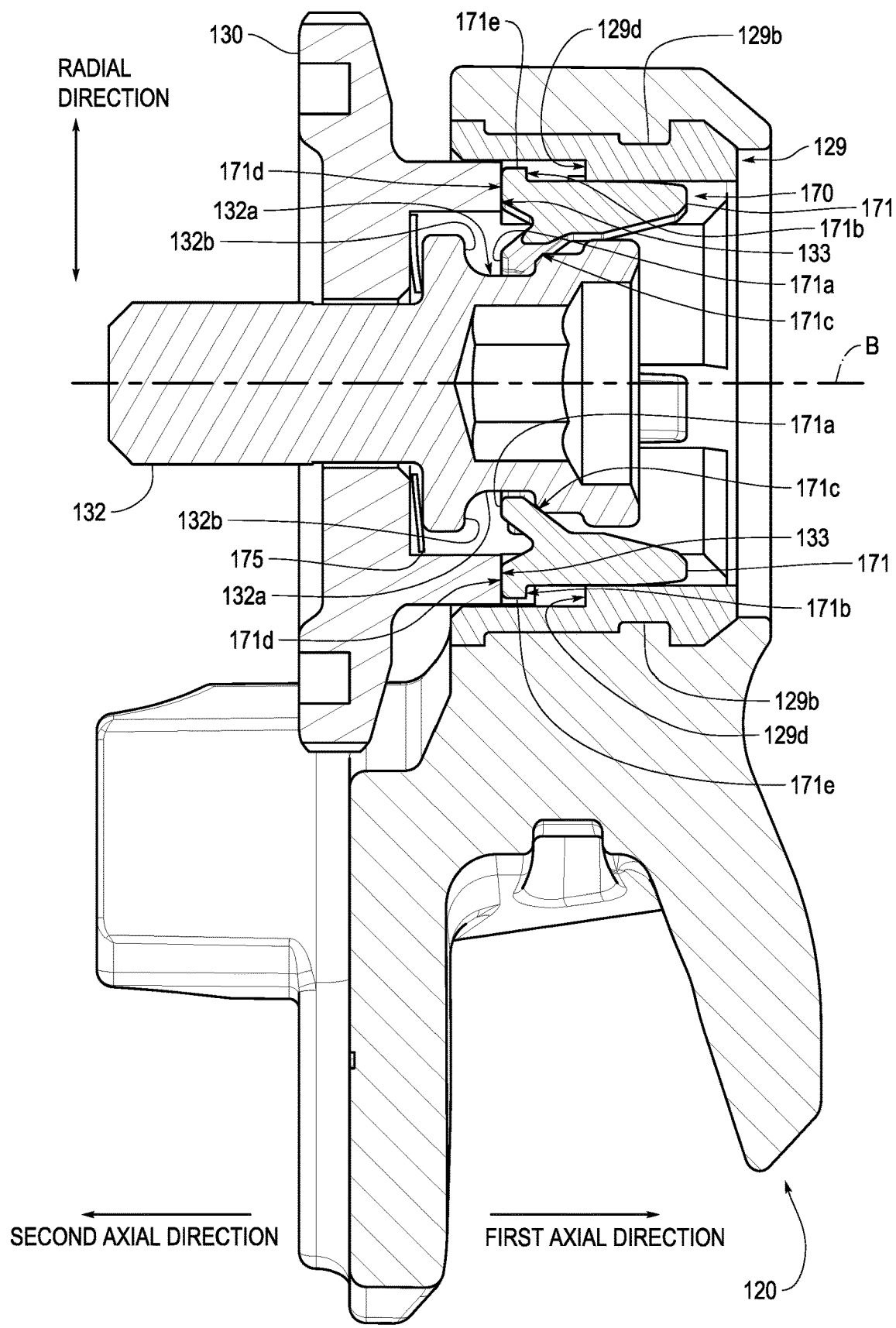
FIG. 15 is a cross-sectional view of a first part of the second exemplary embodiment of the chain guide adjustment assembly.
Figure 16:
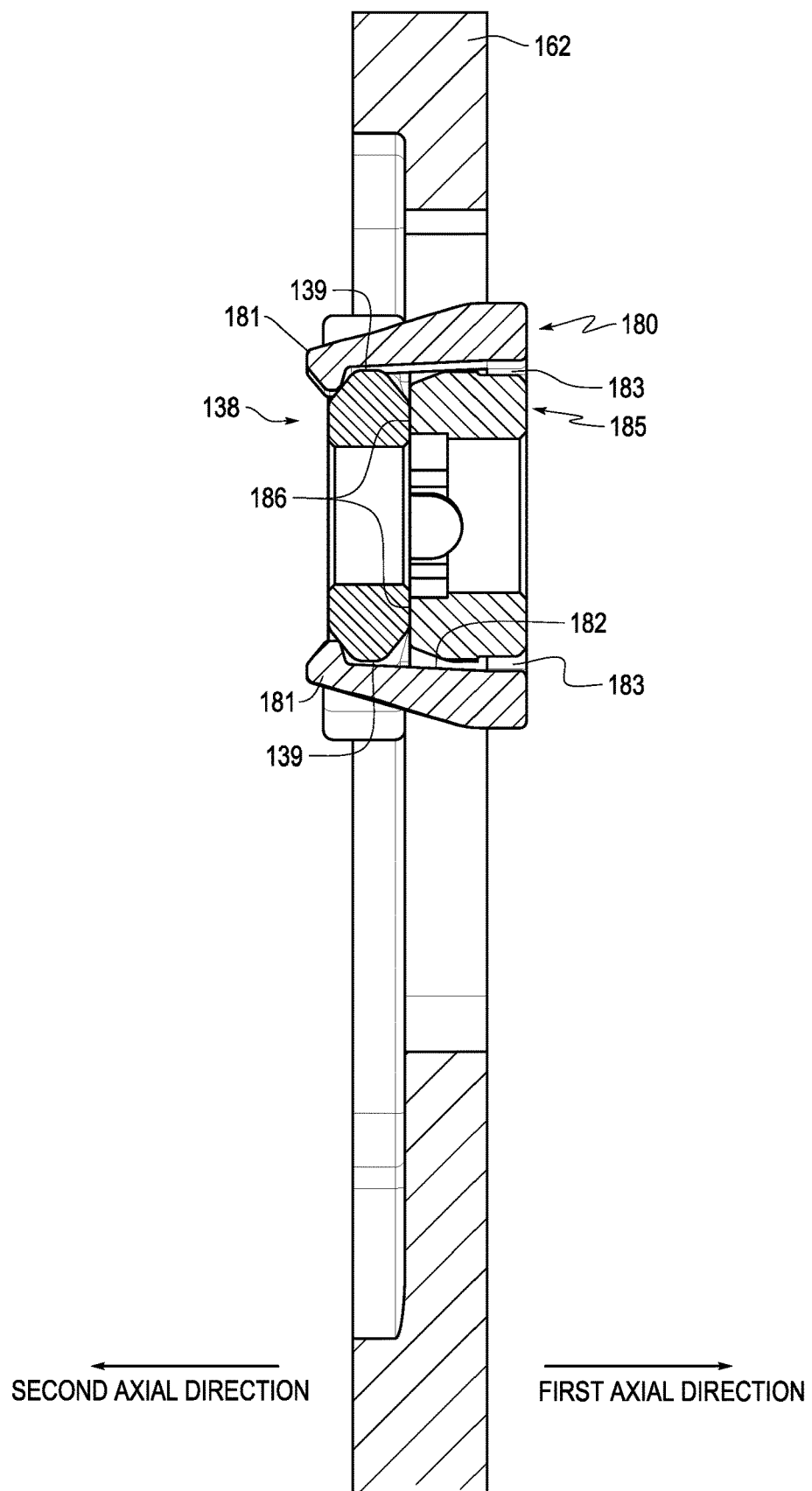
FIG. 16 is a cross-sectional view of a second part of the second exemplary embodiment of the chain guide adjustment assembly.

FIGS. 14-16 show a second exemplary embodiment of the chain guide assembly 100. The second exemplary embodiment of the chain guide assembly 100 primarily differs from the first exemplary embodiment of the chain guide assembly 1 in that it includes a holding member 170, a wave washer 175, a friction nut 185, and a holding washer 180. It should be appreciated that the elements of this second embodiment can be the same as the similarly-named elements of the first embodiment unless they are expressly described as being different. For example, the chain guide 120 of the second embodiment can be configured like any of the chain guides 20a-20d of the first embodiment. Further, although the chain guide assembly includes a base 162 similar to base 62 described above, it can be used with any of the bases 10, 60, or 61 described above as well.

As shown in FIG. 14, the chain guide assembly 100 incudes the chain guide 120 having a threaded portion 129. In this embodiment, the threaded portion 129 is a separate element that can be snap fit or embedded within the chain guide 120. Circumferential ridges 129a on the threaded portion 129 fit within circumferential recesses 120a on the chain guide 120 so that the threaded portion 129 is prevented from moving relative to the chain guide 120 in a direction parallel to the adjusting axis B. It should be appreciated that the circumferential ridges 129a could alternatively be located on the chain guide 120 and the circumferential recesses 120a could alternatively be located on the threaded portion 129. Further, radial notches 129b on the threaded portion 129 accept radial protrusions 120a on the chain guide 120 so that the threaded portion 129 is prevented from rotating relative to the chain guide 120 around the adjusting axis B. It should be appreciated that the radial notches 129b could alternatively be located on the chain guide 120 and the radial recesses 120b could alternatively be located on the threaded portion 129. Furthermore, it should be appreciated that the threaded portion 129 could be made from, for example, metal or plastic and could be attached to the chain guide in other ways such as, for example, by gluing or welding, or it can be formed as an integral part of the chain guide.

As shown in FIG. 14, the chain guide assembly 100 also includes an adjusting member 130, and a fastener 132. The adjusting member 130 operates similarly to the adjusting member 30 of the first embodiment. In this respect, the adjusting member 130 can include a threaded portion 131 that is threadedly engaged with the threaded portion 129. The adjusting member 130 can also include an operating portion such as an operating surface 134 including protrusions that extend radially outward and are manually operated to rotate the adjusting member 130. Although the adjusting member 130 is shown with the operating surface 134 including multiple radially extending operating extensions that are spaced apart from one another in a circumferential direction of the adjusting axis B, it could have larger (like in the first embodiment) or smaller extensions, could include only a single operating portion, or could be an operating dial that lacks any extensions.

As also shown in FIG. 14, the chain guide assembly 100 includes the holding member 170. The holding member 170 includes extensions 171 that extend in a direction substantially parallel to the adjusting axis B. Notches 135 are provided in the adjusting member 130 to accommodate each of the extensions 171 and to allow the extensions 170 to contact the threaded portion 129 of the chain guide 120. Although the holding member 170 is shown in FIG. 14 as including four extensions 171, it can include more or fewer extensions 171. The extensions 171 can be integrally formed as part of the holding member 170 or can be formed separately and attached to the holding member 170. The holding member 170 includes a gap 172 that allows it to be snap fit onto a recess 132a of the fastener 132.

As shown in FIG. 15, the holding member 170 is disposed between the fastener 132 and the chain guide 120 in a radial direction with respect to the adjusting axis B and holds the fastener 132 with respect to the chain guide 120 in a direction parallel to the adjusting axis B. The holding member 170 includes a first abutment 171a to abut the fastener 132 in a first axial direction parallel to the adjusting axis B. In particular, the first abutment 171a faces a first inner surface 132b of the recess 132a of the fastener 132. When the fastener 132 is loosened, it can move in the first axial direction relative to the holding member 170. But, once the first inner surface 132b contacts abutment 171a, the fastener 132 can no longer move in the first axial direction relative to the holding member 170. This way, the holding member 170 limits the movement of the fastener 132 in the first axial direction when it is loosened.

The holding member 170 also includes a second abutment 171b to abut the chain guide 120 in a second axial direction opposite to the first axial direction with respect to the adjusting axis B. In particular, the second abutment 171b faces an inner surface 129d of the threaded portion 129 of the chain guide 120. As explained above, after the first inner surface 132b of the fastener 132 contacts the first abutment 171a, the fastener 132 can no longer move in the first axial direction relative to the holding member 170. However, the holding member 170 and the fastener 132 can move together in the first axial direction until the second abutment 171b contacts the inner surface 129d of the threaded portion 129 of the chain guide 120. This way, the second abutment 171b prevents the holding member 170 and fastener 132 from moving any further in the first axial direction. Thereby, the second abutment 171b further limits the movement of the fastener 132 in the first axial direction when it is loosened and prevents the fastener 132 from separating form the chain guide 120 when it is being loosened.

As shown in FIG. 15, the holding member 170 includes a third abutment 171c to abut the fastener 132 in the second axial direction parallel to the adjusting axis B. In particular, the third abutment 171c faces a second inner surface 132c of the recess 132a of the fastener 132. The holding member 170 also includes a fourth abutment 171d to abut the adjusting member 130 in the first axial direction. In particular, the fourth abutment 171d faces an end surface 133 of the adjusting member 130. When the fastener 132 is tightened, it moves in the second axial direction relative to the holding member 170 and the third abutment 171c and fourth abutment 171d transfer the axial force from the tightening of the fastener 132 to the end surface 133 of the adjusting member 130 so that the chain guide 120 and adjusting member 130 remain in a firmly fixed position along the adjusting axis B when the fastener 132 is tightened.

As can also be seen in FIG. 15, the third abutment 171c includes a tapered surface such that the holding member 170 expands in a radial direction with respect to the adjusting axis B as the fastener is fastened to the base. That is, for example, the third abutment 171c has a tapered or inclined shape. When the axial force of the tightening of the fastener 132 is applied to the third abutment 171c, the tapered shape of the third abutment 171c translates a part of that axial force into a radial force that causes the holding member 170 to expand in the radial direction. This radial expansion ensures that there are not any radial gaps between the holding member 170 and the chain guide 120 that could allow the chain guide to become misaligned or otherwise move (e.g., rattle) in the radial direction in a manner that could allow the chain guide to become misaligned. For example, the holding member 170 could include a fifth abutment 171e to abut the chain guide 120 in a radial direction with respect to the adjusting axis B in a fixed state where the fastener 132 fixes the adjusting member 130 to the base. That is, when the holding member 170 expands radially, the fifth abutment 171e contacts and presses against an inner surface 129c of the threaded portion 129 of the chain guide 120 to eliminate any gaps in the radial direction between the holding member 170 and the chain guide 120 that would allow for any unintended movement in the radial direction once the fastener 132 is tightened.

As shown in FIGS. 14 and 15, the chain guide assembly 100 of the second embodiment also includes the wave washer 175. The wave washer 175 is made of a resilient material such as metal, plastic, rubber, polyurethane, foam, etc. that can be flattened when the fastener 132 is tightened and that can expand when the fastener 132 is loosened to bias the fastener 132 away from the adjusting member 130. This way, even when the fastener 132 is loose, the relative axial movement of the fastener 132 and holding member 170 relative to the chain guide 120 is prevented or reduced.

FIGS. 14 and 16, show the holding washer 180 and the friction nut 185 of the chain guide assembly 100 of the second embodiment. The holding washer 180 includes one or more extensions 181 that respectively fit within corresponding notches 138 in a fixing nut 138 and an opening 182 that surrounds the friction nut 185. Further, the friction nut 185 can include an abutment 186 that contacts an inner surface 183 of the holding washer to prevent movement of the friction nut in the first axial direction when the holding washer is connected to the fixing nut 138. Because the holding washer connects the fixing nut 138 and holding washer 185 in this way, as shown in FIG. 16, even if the fastener 132 is not connected to the fixing nut 138, the fixing nut 138, holding washer 180, and friction nut 185 are held together on the base 162. The extensions 181 can be integrally formed as part of the holding washer 180 or can be separate pieces attached to the holding washer 180.

The friction nut 185 can be made of, for example, plastic, rubber, polyurethane, or of any other material that will create a frictional force against rotation of the fastener 132 to hold the fastener 132 in a loosened state during vertical adjustment of the chain guide 120 relative to the base 162 and prevent unintended rotation of the fastener 132 that might cause the faster 132 to become disengaged from the fixing nut 138. In this respect, the holding washer 180 can include one or more radial notches 183 that accept corresponding rail protrusions 187 on the friction nut 185 to prevent rotation of the friction nut 185 relative to the fixing nut 138 when the fastener 132 is being tightened or loosened. It should be appreciated that the radial notches 183 could alternatively be located on the friction nut 185 and the radial protrusions 187 could alternatively be located on the holding washer 180.

In the above description and appended claims, the term "comprising" and its derivatives, are intended to be open-ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include," and their derivatives. Terms of degree such as "general" or "generally" are intended to impart a reasonable amount of deviation to the extent that an end result or intended effect is not significantly changed. Further, as used herein, the terms "front," "back," "center," inside," "outside," "up," "down," "top," "bottom," and their derivatives refer to directions as viewed from a state in which a rider of a bicycle is sitting on a saddle of the bicycle and facing towards the handlebar. As used herein, the terms "upstream" and "downstream" refer to a travel direction of the bicycle chain when it is moving in a direction that would cause the rear wheel to move the bicycle forward. Finally, in the appended claims, the phrase "mounted state" is intended to describe the positional relationship of claim elements relative to one another or relative to other bicycle parts from the perspective of when they are mounted to the bicycle. The term "mounted state" in the claims is not intended to require that the claimed components are actually mounted to the bicycle.

While exemplary embodiments have been described to explain the inventive principles, it will be apparent to a skilled artisan that various changes and modifications can be made herein without departing from the broad inventive principles. For example, unless otherwise noted, the size, shape, location or orientation of the various components can be changed as needed and/or desired. Components that are shown directly connected or contacting each other can have intermediate structures disposed between them. The functions of one element can be performed by two, and vice versa. It is not necessary for all of the advantages described herein to be achieved by a particular embodiment at the same time. Thus, the foregoing descriptions of the exemplary embodiments need not limit the appended claims unless expressly recited therein.

What is claimed is:

1. A bicycle chain guide assembly comprising:
   a base configured to be mounted to a bicycle, the bicycle including a solitary sprocket having a rotational center axis;
   a chain guide disposed above the solitary sprocket in a mounted state where the base is mounted to the bicycle, the chain guide including:
      a first guide plate having a first guiding surface and a first lower end;
      a second guide plate closer to the base than the first guide plate, the second guide plate having a second guiding surface facing the first guiding surface to define a chain guiding slot between the first guiding surface and the second guiding surface, the second guiding plate having a second lower end; and
      a bridge connecting the first guide plate and the second guide plate;
   wherein:
      the first guiding surface includes a first part and a second part closer to the bridge than the first part, the second part being inclined relative to the first part as viewed from a direction perpendicular to the rotational axis such that a distance defined between the second part and the second guiding surface in an axial direction parallel to the rotational center axis decreases from the first part toward the bridge, and
      the first lower end and the second lower end are configured to be positioned towards the rotational center axis in a radial direction of the solitary sprocket so that, in the mounted state: (i) the first lower end and the second lower end are located radially inwardly in the radial direction with respect to a tip of a tooth of the solitary sprocket, (ii) the first lower end and the second lower end are on respectively opposite sides of the solitary sprocket as viewed from the direction perpendicular to the rotational axis, and (iii) the first lower end overlaps the tip of the tooth of the solitary sprocket as viewed in the axial direction.

2. The bicycle chain guide assembly of claim 1, wherein:
   the first guide plate has a first upper end and a first lower end;
   the second guide plate has a second upper end and a second lower end;
   the first lower end is closer to the solitary sprocket than the first upper end in the mounted state;
   the second lower end is closer to the solitary sprocket than the second upper end in the mounted state; and
   the bridge connects the first upper end and the second upper end.

3. A bicycle chain guide adjustment assembly comprising:
   a base configured to be mounted to a bicycle having a solitary sprocket;
   a chain guide; and
   an adjusting member rotatably coupled to at least one of the base and the chain guide around an adjusting axis such that rotation of the adjusting member around the adjusting axis moves a first position of the chain guide relative to the base in a direction parallel to the adjusting axis, the adjusting member including an operating portion manually operated to rotate the adjusting member.

4. The bicycle chain guide adjustment assembly of claim 3, wherein the chain guide includes a first guide plate and a second guide plate spaced apart from the first guide plate to define a chain guiding slot between the first guide plate and the second guide plate.

5. The bicycle chain guide assembly of claim 3, wherein the adjusting member is engaged with one of the base and the chain guide.

6. The bicycle chain guide adjustment assembly of claim 3, wherein the adjusting member includes a first threaded portion that is threadedly engaged with the one of the base and the chain guide.

7. The bicycle chain guide adjustment assembly of claim 6, wherein:
   the chain guide includes a second threaded portion that is threadedly engaged with the first threaded portion, the second threaded portion being made of a metallic material.

8. The bicycle chain guide adjustment assembly of claim 7, wherein:
   the chain guide includes a first guide plate and a second guide plate spaced apart from the first guide plate to define a chain guiding slot between the first guide plate and the second guide plate; and
   at least one of the first guide plate and the second guide plate is made of non-metallic material.

9. The bicycle chain guide adjustment assembly of claim 3, further comprising a fastener to fix the adjusting member to the other of the base and the chain guide.

10. The bicycle chain guide adjustment assembly of claim 9, wherein the adjusting member is configured to be rotatable in a state where the fastener is loose.

11. The bicycle chain guide adjustment assembly of claim 9, further comprising a holding member to hold the fastener with respect to the chain guide in the direction parallel to the adjusting axis.

12. The bicycle chain guide adjustment assembly of claim 11, wherein the holding member includes a first abutment to abut the fastener in a first axial direction parallel to the adjusting axis and a second abutment to abut the chain guide in a second axial direction opposite to the first axial direction with respect to the adjusting axis.

13. The bicycle chain guide adjustment assembly of claim 12, wherein the holding member includes a third abutment to abut the fastener in the second axial direction parallel to the adjusting axis and a fourth abutment to abut the adjusting member in the first axial direction.

14. The bicycle chain guide adjustment assembly of claim 13, wherein the third abutment includes a tapered surface such that the holding member expands in a radial direction with respect to the adjusting axis as the fastener is fastened to the base.

15. The bicycle chain guide adjustment assembly of claim 12, wherein the holding member includes a fifth abutment to abut the chain guide in a radial direction with respect to the adjusting axis in a fixed state where the fastener fixes the adjusting member to the base.

16. The bicycle chain guide adjustment assembly of claim 11, wherein the holding member is disposed between the fastener and the chain guide in a radial direction with respect to the adjusting axis.

17. The bicycle chain guide adjustment assembly of claim 3, wherein the adjusting member is disposed between the base and the chain guide in the direction parallel to the adjusting axis.

18. A bicycle chain guide adjustment assembly comprising:
   a base configured to be mounted to a bicycle having a solitary sprocket;
   a chain guide; and
   an adjusting member rotatably coupled to at least one of the base and the chain guide around an adjusting axis such that rotation of the adjusting member around the adjusting axis moves a first position of the chain guide relative to the base in a direction parallel to the adjusting axis, the adjusting member including an operating extension extending radially outward with respect to the adjusting axis.

19. A bicycle chain guide adjustment assembly comprising:
   a base configured to be mounted to a bicycle having a solitary sprocket;
   a chain guide;
   an adjusting member rotatably coupled to at least one of the base and the chain guide around an adjusting axis such that rotation of the adjusting member around the adjusting axis moves a first position of the chain guide relative to the base in a direction parallel to the adjusting axis; and
   a rotation preventing structure configured to prevent relative rotation between the chain guide and the base around the adjusting axis.

20. A bicycle chain guide adjustment assembly comprising:
   a base configured to be mounted to a bicycle having a solitary sprocket, the base including an adjusting slot extending in a direction non-parallel to the adjusting axis, the adjusting slot permitting adjustment of a second position of the chain guide along the adjusting slot;
   a chain guide; and
   an adjusting member rotatably coupled to at least one of the base and the chain guide around an adjusting axis such that rotation of the adjusting member around the adjusting axis moves a first position of the chain guide relative to the base in a direction parallel to the adjusting axis.

* * * * *